(12) United States Patent
Hua et al.

(10) Patent No.: US 11,144,413 B2
(45) Date of Patent: Oct. 12, 2021

(54) CLUSTER MEMBER TRANSFER FOR RAID SYSTEM EXPANSION

(71) Applicant: EMC IP HOLDING COMPANY LLC, Hopkinton, MA (US)

(72) Inventors: Kuolin Hua, Natick, MA (US); Kunxiu Gao, Boxborough, MA (US)

(73) Assignee: Dell Products L.P., Hopkinton, MA (US)

(*) Notice: Subject to any disclaimer, the term of this patent is extended or adjusted under 35 U.S.C. 154(b) by 0 days.

(21) Appl. No.: 16/797,018

(22) Filed: Feb. 21, 2020

(65) Prior Publication Data

US 2021/0263814 A1 Aug. 26, 2021

(51) Int. Cl.
*G06F 3/06* (2006.01)
*G06F 11/20* (2006.01)

(52) U.S. Cl.
CPC ........ *G06F 11/2053* (2013.01); *G06F 3/0607* (2013.01); *G06F 3/0635* (2013.01); *G06F 3/0689* (2013.01)

(58) Field of Classification Search
CPC .... G06F 3/0607; G06F 3/0605; G06F 3/0635; G06F 3/0631; G06F 3/0689; G06F 3/067; G06F 3/0647; G06F 3/0629; G06F 11/1092; G06F 11/2053
See application file for complete search history.

(56) References Cited

U.S. PATENT DOCUMENTS

| | | | |
|---|---|---|---|
| 10,210,045 B1* | 2/2019 | Gao | G06F 11/1076 |
| 2005/0102551 A1* | 5/2005 | Watanabe | G06F 3/0607 |
| | | | 714/6.2 |
| 2011/0264856 A1* | 10/2011 | Breda | G06F 3/0605 |
| | | | 711/114 |

* cited by examiner

*Primary Examiner* — Ernest Unelus
(74) *Attorney, Agent, or Firm* — Anderson Gorecki LLP (57) ABSTRACT

In a storage system that implements RAID (D+P) with an existing cluster of drives in which the drives have (D+P) partitions that are protection group members, cluster member transfer code creates a new drive cluster when fewer than D+P new drives are added to the storage system. The cluster member transfer code moves one or more drives from the existing cluster into a new cluster so that the number of new drives plus the number of moved drives equals D+P. One or more protection groups may be moved to the new cluster.

20 Claims, 6 Drawing Sheets

CLUSTER MEMBER TRANSFER FOR RAID SYSTEM EXPANSION

TECHNICAL FIELD

The subject matter of this disclosure is generally related to data storage, and more particularly to data storage systems that implement protection groups.

BACKGROUND

It is well known to organize storage media such as hard disk drives (HDDs) and solid-state drives (SSDs) into redundant arrays of independent drives (RAID) protection groups to reduce the likelihood of data loss in the event of drive failure. A RAID (D+P) protection group has D data members and P parity members. Each member is an individual drive in typical prior art implementations. The parity members store parity information such as cyclic redundancy check (CRC) error correction codes that enable reconstruction of data when a data member fails. The data members store the data that is protected by the parity information.

The storage capacity of a storage system can be increased by adding new drives as existing drives become fully utilized. The storage capacity of storage systems that implement RAID (D+P) can be scaled-up by adding new RAID protection groups, i.e. adding integer multiples of (D+P) drives. For example, a storage system that implements RAID-5 (4+1) may be scaled-up in increments of five new drives. Similarly, a RAID-5 (3+1) may be scaled-up in increments of four new drives. One drawback of the standard scaling technique is that an increment of D+P drives is becoming less efficient as the storage capacity of individual drives increases due to technological advancements. More specifically, as the storage capacity and cost of commercially available drives increases, adding D+P drives to a storage system may add excess storage capacity that will not be utilized within a reasonable timeframe.

SUMMARY

All examples, aspects and features mentioned in this document can be combined in any technically possible way.

In accordance with some aspects an apparatus comprises: at least one computing node comprising a processor and non-transitory memory; an existing cluster of C drives managed by the at least one computing node, wherein protection groups each comprising (D+P) members are implemented on the existing cluster, wherein each D member contains data and each P member contains parity information; and computer program code, executed by the processor and responsive to introduction of N new drives, comprising: partitioning instructions that partition each new drive into (D+P) partitions; and transfer instructions responsive to determining that N is less than (D+P) and C is greater than (D+P) to select a donor drive from the existing cluster and form a new cluster using the donor drive and the new drives. Some implementations comprise selection instructions that select a protection group on the existing cluster for migration such that a first member of the selected protection group resides on the donor drive. In some implementations the transfer instructions move members of the selected protection group other than the first member to the new drives. In some implementations the transfer instructions distribute the members of the selected protection group other than the first member to different ones of the new drives such that no more than one member of the selected protection group resides on a single one of the new drives. In some implementations the transfer instructions move members of protection groups other than the selected protection group from the donor drive to other drives of the existing cluster. In some implementations the transfer instructions move the members of protection groups other than the selected protection group from the donor drive to other drives of the existing cluster such that no more than one of the members of any protection group resides on a single one of the other drives of the existing cluster. In some implementations the transfer instructions move the donor drive with the first member to the new cluster.

In accordance with some aspects a method comprises: in a storage system comprising at least one computing node, comprising a processor and non-transitory memory, and an existing cluster of C drives managed by the at least one computing node, wherein protection groups each comprising (D+P) members are implemented on the existing cluster, wherein each D member contains data and each P member contains parity information: responsive to introduction of N new drives, partitioning each new drive into (D+P) partitions; responsive to determining that N is less than (D+P) and C is greater than (D+P), selecting a donor drive from the existing cluster; and forming a new cluster using the donor drive and the new drives. Some implementations comprise selecting a protection group on the existing cluster for migration such that a first member of the selected protection group resides on the donor drive. Some implementations comprise moving members of the selected protection group other than the first member to the new drives. Some implementations comprise distributing the members of the selected protection group other than the first member to different ones of the new drives such that no more than one member of the selected protection group resides on a single one of the new drives. Some implementations comprise moving members of protection groups other than the selected protection group from the donor drive to other drives of the existing cluster. Some implementations comprise moving the members of protection groups other than the selected protection group from the donor drive to other drives of the existing cluster such that no more than one of the members of any protection group resides on a single one of the other drives of the existing cluster. Some implementations comprise moving the donor drive with the first member to the new cluster.

In accordance with some aspects in a computer-readable storage medium storing instructions that when executed by a computer cause the computer to perform a method for using a computer system to increase storage capacity, the method comprises: responsive to introduction of N new drives to a system comprising an existing cluster of C drives managed by at least one computing node, wherein protection groups each comprising (D+P) members that are implemented on the existing cluster, and wherein each D member contains data and each P member contains parity information, partitioning each new drive into (D+P) partitions; responsive to determining that N is less than (D+P) and C is greater than (D+P), selecting a donor drive from the existing cluster; and forming a new cluster using the donor drive and the new drives. In some implementations the method further comprises selecting a protection group on the existing cluster for migration such that a first member of the selected protection group resides on the donor drive. In some implementations the method further comprises moving members of the selected protection group other than the first member to the new drives. In some implementations the method further comprises moving members of protection groups other than the selected protection group from the donor drive to other drives of the existing cluster. In some implementations the method further comprises moving the members of protection groups other than the selected protection group from the donor drive to other drives of the existing cluster such that no more than one of the members of any protection group resides on a single one of the other drives of the existing cluster. In some implementations the method further comprises moving the donor drive with the first member to the new cluster.

Other aspects, features, and implementations may become apparent in view of the detailed description and figures.

DETAILED DESCRIPTION

The terminology used in this disclosure is intended to be interpreted broadly within the limits of subject matter eligibility. The terms "disk" and "drive" are used interchangeably herein and are not intended to refer to any specific type of non-volatile storage. The terms "logical" and "virtual" are used to refer to features that are abstractions of other features, e.g. and without limitation abstractions of tangible features. The term "physical" is used to refer to tangible features that possibly include, but are not limited to, electronic hardware. For example, multiple virtual computers could operate simultaneously on one physical computer. The term "logic" is used to refer to special purpose physical circuit elements, firmware, software, computer instructions that are stored on a non-transitory computer-readable medium and implemented by multi-purpose tangible processors, and any combinations thereof.

Aspects of the inventive concepts are described as being implemented in a data storage system that includes host servers and a storage area network (SAN), which may also be referred to as a storage array. Such implementations should not be viewed as limiting. Those of ordinary skill in the art will recognize that there are a wide variety of implementations of the inventive concepts in view of the teachings of the present disclosure. Some aspects, features, and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory computer-readable medium. Furthermore, it will be understood by those of ordinary skill in the art that the computer-executable instructions may be executed on a variety of tangible processor devices, i.e. physical hardware. For practical reasons, not every step, device, and component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

Figure 1:
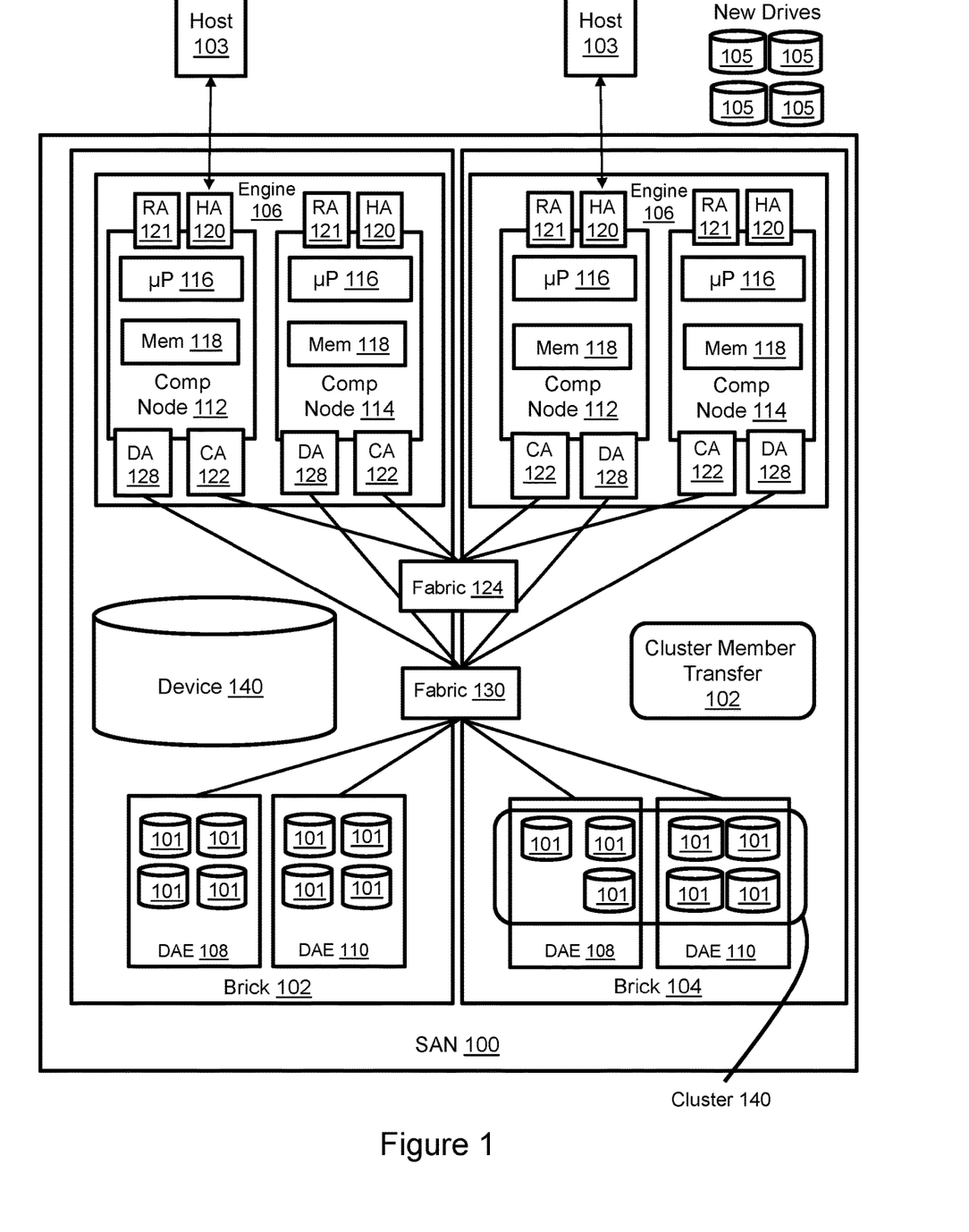
FIG. 1 illustrates a storage array with cluster member transfer code for creating a new drive cluster when fewer than D+P new drives are added.

FIG. 1 illustrates a SAN 100 with cluster member transfer code 102 for creating a new drive cluster when fewer than D+P new drives 105 are added to the SAN. The SAN implements RAID (D+P) protection groups in drive clusters that can be scaled-up in single drive increments. For example, an existing drive cluster 140 may include multiple protection groups and be scaled-up in storage capacity increments as small as one drive with protection group members distributed as described in U.S. Ser. No. 16/508,762 titled SCALING RAID-BASED STORAGE BY REDISTRIBUTING SPLITS which is incorporated by reference. Although the existing cluster 140 could be scaled-up to include any number of drives that can be supported by interfaces and interconnection hardware, multiple smaller clusters may be preferable to a single larger cluster. As will be explained in greater detail below, the cluster member transfer code 102 moves one or more drives from the existing cluster into a new cluster so that the number of new drives plus the number of moved drives totals at least D+P, which enables the new cluster to comply with RAID member distribution limitations. Movement of drives does not imply physical movement and the term "move" is used interchangeably with "migrate" and "transfer."

The SAN 100 is depicted in a simplified data center environment that includes two hosts 103. The hosts may be server computers that include volatile memory, non-volatile storage, one or more tangible processors, and a hypervisor or operating system. Instances of applications (host applications) running on each host use data that is maintained by the SAN. Examples of host applications may include email programs, inventory control programs, and accounting programs, for example and without limitation.

The SAN 100 includes one or more bricks 102, 104. Each brick includes an engine 106 and one or more drive array enclosures (DAEs) 108, 110. Each DAE includes managed drives 101 of one or more technology types. Examples may include, without limitation, SSDs such as flash and HDDs with spinning disk storage media. Each engine 106 includes a pair of interconnected computing nodes 112, 114, which may be referred to as "storage directors." Each computing node includes resources such as at least one multi-core processor 116 and local memory 118. The processor may include central processing units (CPUs), graphics processing units (GPUs), or both. The local memory 118 may include volatile memory such as dynamic random-access memory (DRAM), non-volatile memory (NVM) such as storage class memory (SCM), or both. Each computing node includes one or more host adapters (HAs) 120 for communicating with the hosts 103. Each host adapter has resources for servicing input-output commands (IOs) from the hosts. The resources may include processors, volatile memory, and ports via which the hosts may access the SAN. Each computing node also includes a remote adapter (RA) 121 for communicating with other storage systems. Each computing node also includes one or more drive adapters (DAs) 122 for communicating with the managed drives 101 in the DAEs 108, 110. Each drive adapter has processors, volatile memory, and ports via which the computing node may access the DAEs for servicing IOs. Each computing node may also include one or more channel adapters (CAs) 122 for communicating with other computing nodes via an interconnecting fabric 124. Each computing node may allocate a portion or partition of its respective local memory 118 to a shared memory that can be accessed by other computing nodes, e.g. via direct memory access (DMA) or remote DMA (RDMA). The paired computing nodes 112, 114 of each engine 106 provide failover protection and may be directly interconnected by communication links. An interconnecting fabric 130 enables implementation of an M-way active-active backend. A backend connection group includes all drive adapters that can access the same drive or drives. In some implementations every drive adapter 128 in the SAN can reach every DAE via the fabric 130. Further, in some implementations every drive adapter in the SAN can access every managed drive 101 in the SAN.

Data associated with instances of the hosted application instances running on the hosts is maintained on the managed drives 101 of the SAN 100. The managed drives 101 are not discoverable by the hosts but the SAN 100 creates a logical storage device 140 that can be discovered and accessed by the hosts. Without limitation, the logical storage device may be referred to as a source device, production volume, production device, or production LUN, where the logical unit number (LUN) is a number used to identify logical storage volumes in accordance with the small computer system interface (SCSI) protocol. From the perspective of the hosts, the logical storage device 140 is a single drive having a set of contiguous fixed-size logical block addresses (LBAs) on which data used by the instances of the host application resides. However, the host application data is stored at non-contiguous addresses on various managed drives 101.

Figure 2:
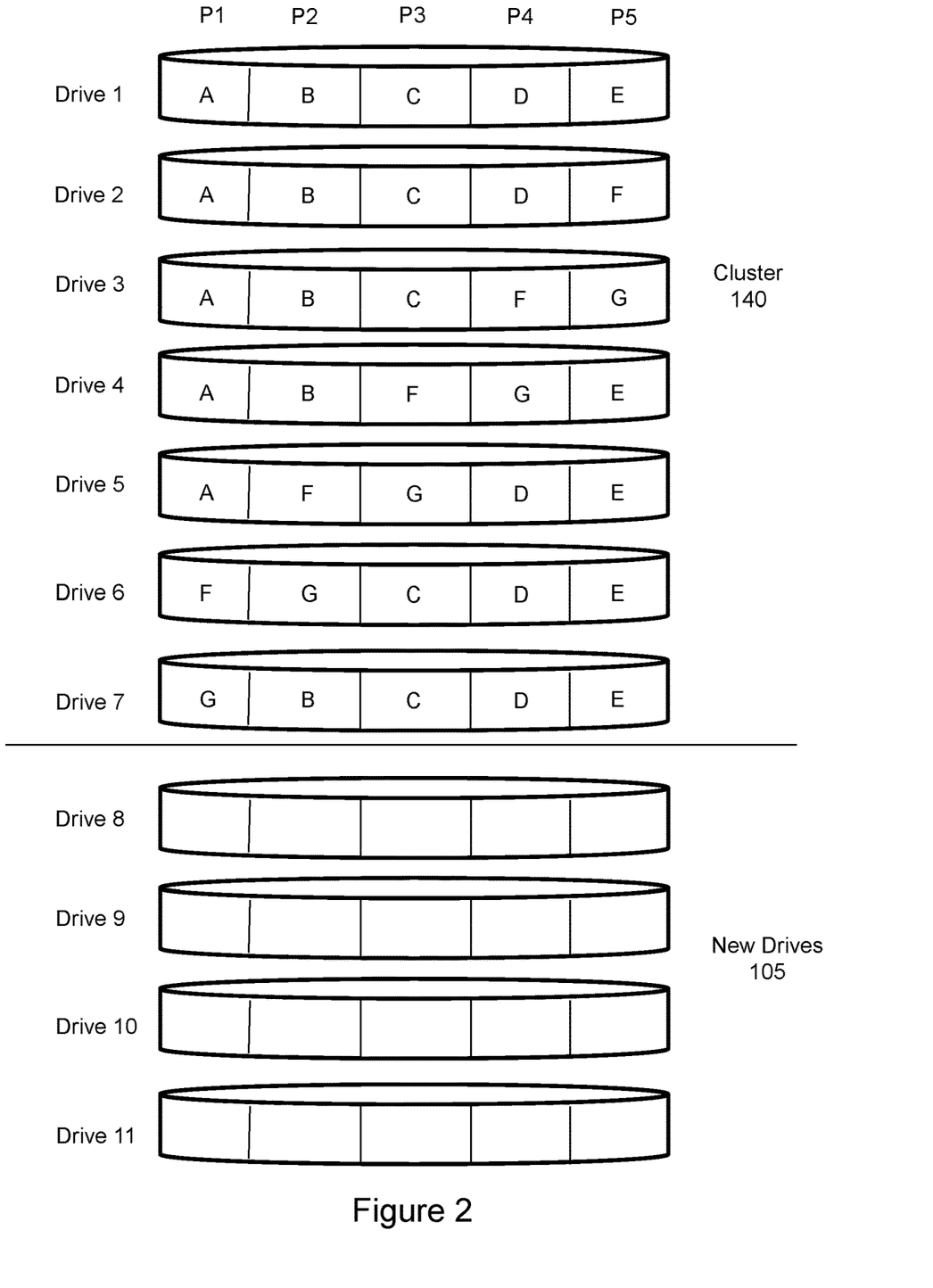
FIGS. 2 through 5 illustrate movement of members and drives to create the new drive cluster.

Referring to FIGS. 1 and 2, the managed drives 101 are organized into drive clusters in which the RAID (D+P) protection groups are implemented. RAID-5 (4+1) is implemented in the illustrated example so (D+P)=(4+1)=5. Each drive cluster is a matrix of at least R rows (drives) by R columns (partitions), where R=D+P. Because drive clusters can be scaled in single drive increments, an existing drive cluster may have more than R drives. For example, existing drive cluster 140 is a matrix of N rows (drives) by R columns (partitions), where N>R (specifically, R=5 and N=7). The seven managed drives are designated as drive 1 through drive 7 in FIG. 2 and each of those drives is divided into five partitions. The five partitions are designated as P1, P2, P3, P4, and P5. Unlike traditional RAID implementations in which individual drives are members of the RAID protection group, e.g. five drives in a RAID-5 (4+1), the partitions P1, P2, P3, P4, and P5 of each drive 1-7 are RAID protection group members. In the illustrated example there are seven different RAID protections groups implemented on the existing drive cluster 140 using the partition-based RAID member domains. The RAID protection groups are designated as A, B, C, D, E, F, and G. For example, each drive partition marked as A is a member of RAID protection group A. Similarly, each drive partition marked as B is a member of RAID protection group B. The protection group members are distributed among the drives of the cluster such that no single drive includes more than one member of the same RAID protection group, e.g. no more than one member A per drive. Use of the drive partitions as RAID member domains enables the cluster 140 to be scaled in single drive increments because each new drive adds D+P partitions, which is enough partitions to support creation of a new RAID (D+P) protection group, albeit with the requirement of redistributing members to avoid having multiple members of the same protection group on the same drive.

A problem is presented when it is undesirable to further scale-up the existing cluster 140 and fewer than D+P new drives 105 are added, as in the illustrated example in which four new drives 105 designated as drive 8 through drive 11 are added to the SAN, because the number of new drives is insufficient to create a new cluster. The cluster member transfer code 102 recognizes that it is undesirable to further scale the existing cluster 140 and recognizes that the number of new drives 105 is insufficient to create a new cluster using only the new drives. The cluster member transfer code 102 further recognizes that the existing drive cluster 140 has greater than D+P drives. Accordingly, the cluster member transfer code 102 migrates one or more drives out of the existing cluster 140 so that a new cluster can be created using a group of drives that includes the migrated drives and the new drives. The new drive cluster is typically a matrix of R rows (drives) by R columns (partitions). The migration may include moving one or more RAID protection groups from the existing cluster to the new cluster as will be explained below.

Figure 3:
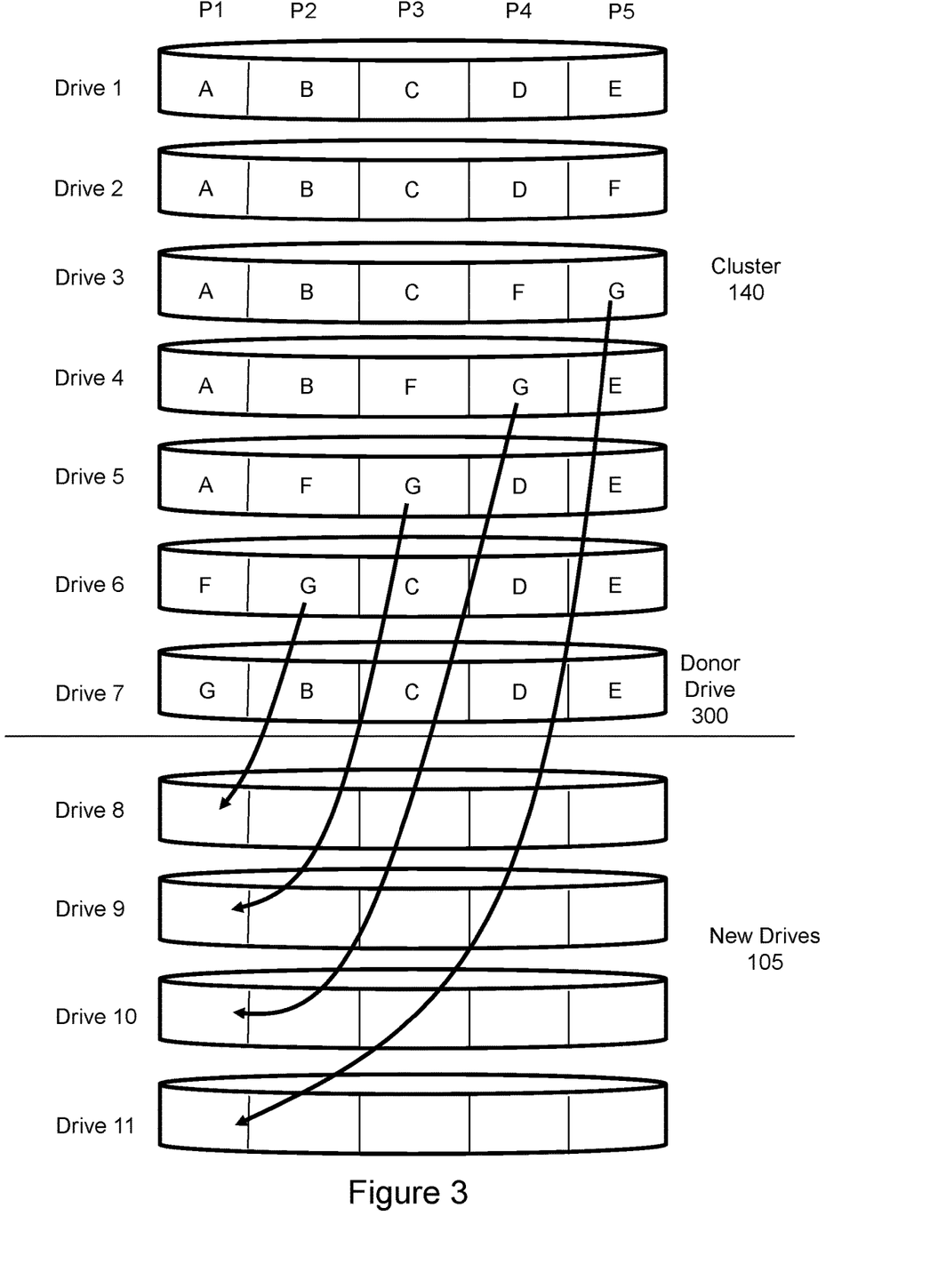

Referring to FIG. 3, the cluster member transfer code 102 determines that one additional drive is required to enable formation of a new cluster using the new drives where RAID-5 (4+1) is implemented because there are only four new drives. The cluster member transfer code 102 selects one drive from the existing cluster 140 to be a donor drive 300. Drive 7 is selected as the donor drive in the illustrated example. The cluster member transfer code then selects a RAID protection group with a member on the donor drive to migrate to the new cluster. The member of the selected protection group on the donor drive is migrated along with the donor drive. Raid protection group G is selected in the illustrated example and the member G at partition P1 of drive 7 is migrated to the new cluster with the donor drive.

To prepare the donor drive 300 for migration the cluster member transfer code 102 moves the other (non-migrating) members of the selected protection group (protection group G in the illustrated example) to the new drives 105 in accordance with the RAID member distribution limitations that only one member of a RAID protection group may be stored on any single drive. For (x=1; x<R; x++) {Disk[N+x]. Partition[1]=Disk[N-x]. Partition[x+1] }. In the illustrated example the member of group G at partition P2 of drive 6 is moved to partition P1 of drive 8. The member of group G at partition P3 of drive 5 is moved to partition P1 of drive 9. The member of group G at partition P4 of drive 4 is moved to partition P1 of drive 10. The member of group G at partition P5 of drive 3 is moved to partition P1 of drive 11. Each of the members of protection group G resides on a different drive after migration.

Figure 4:
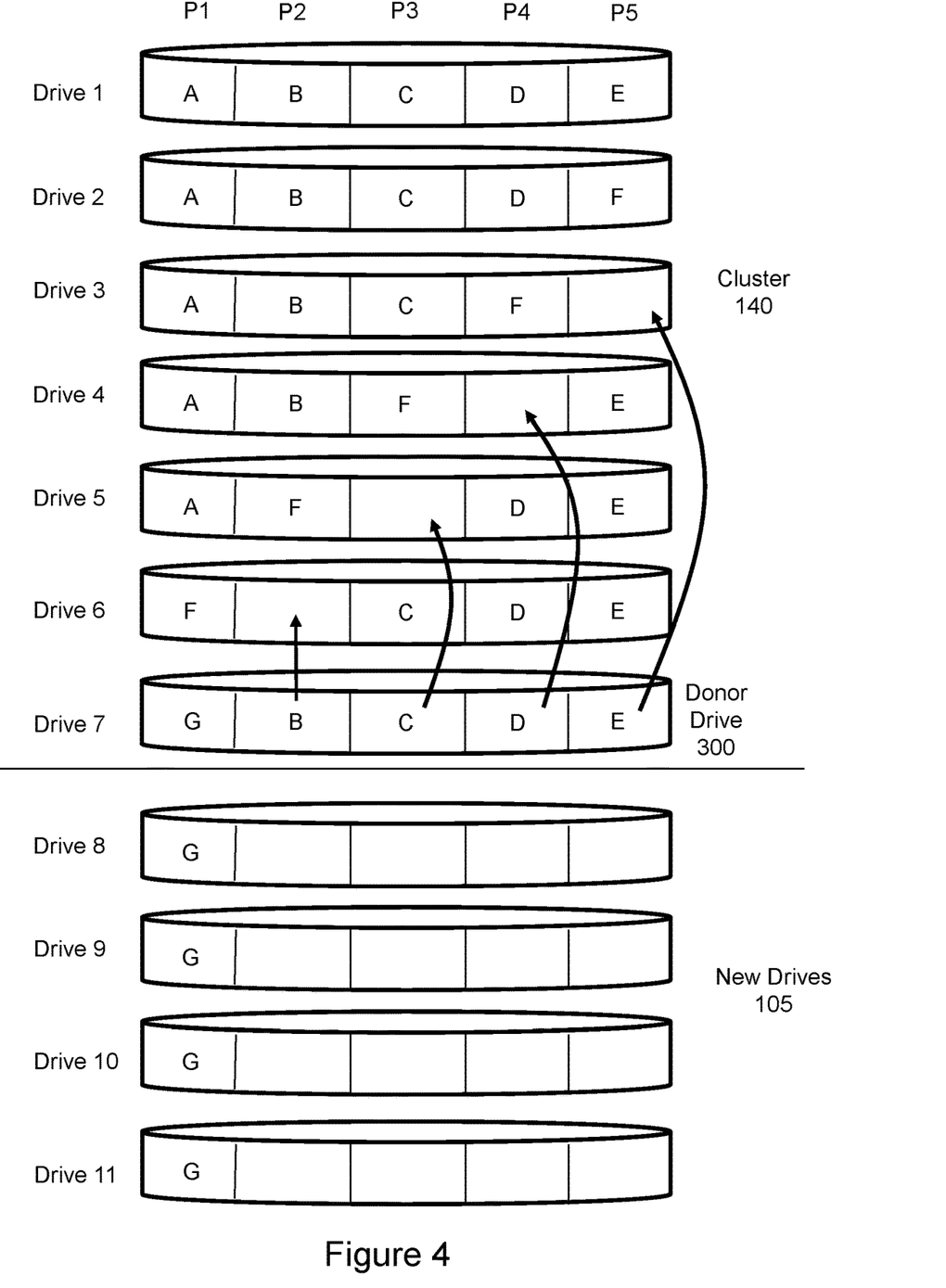

Referring to FIG. 4, the members residing on the donor drive that are not selected for migration with the donor drive (B, C, D, and E in the illustrated example) are moved to the partitions vacated by the members of the group selected for migration in accordance with RAID member distribution limitations. For (x=1; x<R; x++) {Disk[N-x]. Partition[x+1]=Disk[N]. Partition[x+1] }. In the illustrated example the member of group B at partition P2 of drive 7 is moved to partition P2 of drive 6. The member of group C at partition P3 of drive 7 is moved to partition P3 of drive 5. The member of group D at partition P4 of drive 7 is moved to partition P4 of drive 4. The member of group E at partition P5 of drive 7 is moved to partition P5 of drive 3.

Figure 5:
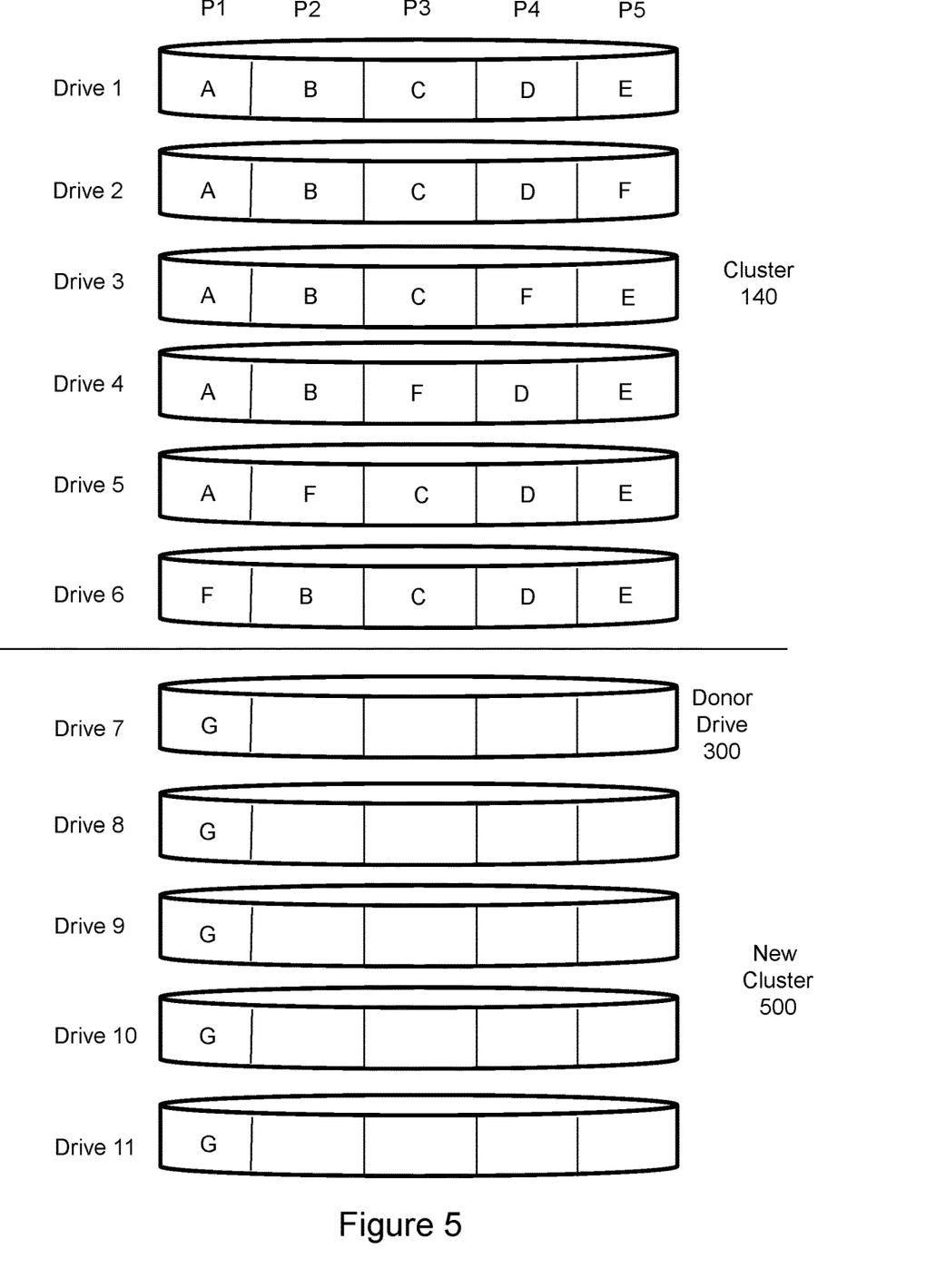

Referring to FIG. 5, after moving the non-migrating members the donor drive 300 has only the migrating member G at partition P1 remaining. The donor drive is then moved from the existing cluster 140 to new cluster 500 which is formed from the donor drive (drive 7) and the four new drives (drives 8 through 11). All members of RAID protection group G are in the newly formed cluster 500 and are distributed among the drives of the new cluster in accordance with RAID member distribution limitations. When more storage capacity is needed, a new RAID protection group is created in the new cluster. For example, and without limitation, a RAID protection group H may be created with members at partition P2 of drives 7 through 11.

Figure 6:
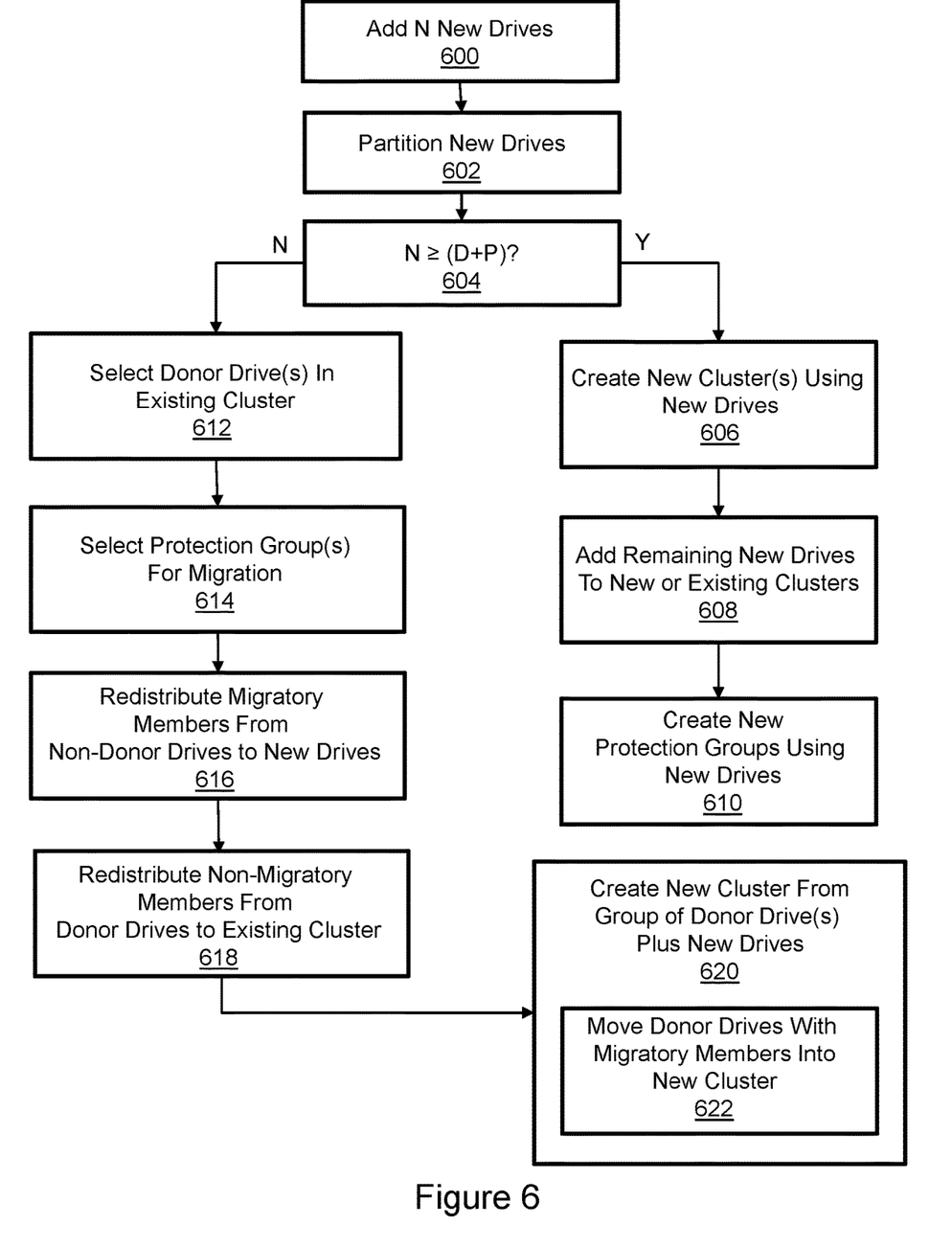
FIG. 6 illustrates operation of the cluster member transfer code in greater detail.

FIG. 6 illustrates operation of the cluster member transfer code in greater detail. N new drives are added to a storage system as indicated in step 600. The new drives are partitioned as indicated in step 602. Specifically, the new drives are each configured with R=D+P partitions for a system that implements RAID (D+P). If there are enough new drives to create a new cluster, i.e. if N≥(D+P), then at least one new cluster is created from the new drives as indicated in step 606. For example, one new cluster may be created if there are fewer than 2(D+P) new drives whereas two new clusters may be created if there are at least 2(D+P) new drives. Any remaining new drives may be added to new or existing clusters as indicated in step 608. New protection groups are created on the new drives in accordance with RAID member distribution limitations as indicated in step 610.

If there is an insufficient number of new drives to create a new cluster, i.e. if N<(D+P) as determined in step 604, then at least one donor drive is selected as indicated in step 612. The number of donor drives C may be calculated such that (C+N)=(D+P). At least one protection group with a member residing on each donor drive is selected to be migrated as indicated in step 614. The members of the selected protection group are referred to as migrating members. The migrating members residing on drives other than the donor drives are moved from the existing cluster to the new drives in accordance with RAID member distribution limitations as indicated in step 616. More particularly, the migrating members are moved to drive partitions selected such that no more than one migrating member of a given protection group resides on any single new drive. Members other than the migrating members remaining on the donor drives are moved to available partitions in the existing cluster in accordance with RAID member distribution limitations as indicated in step 618. For example, the non-migrating members on the donor drives may be moved to the partitions vacated by the migrating members in step 616. A new cluster is then created from the donor drives and the new drives as indicated in step 620. Creation of the new cluster includes moving the donor drives into the new cluster with the migrating members residing thereon as indicated in step 622. Movement of members and drives does not imply physical movement.

Specific examples have been presented to provide context and convey inventive concepts. The specific examples are not to be considered as limiting. A wide variety of modifications may be made without departing from the scope of the inventive concepts described herein. Moreover, the features, aspects, and implementations described herein may be combined in any technically possible way. Accordingly, modifications and combinations are within the scope of the following claims.

What is claimed is:

1. An apparatus, comprising:
   at least one computing node comprising a processor and non-transitory memory;
   an existing cluster of C drives managed by the at least one computing node, wherein redundant array of independent drives (RAID) protection groups each comprising no more or less than (D+P) members are implemented on the existing cluster, wherein D and P are constants and each D member contains data respectively being used to rebuild at least one parity member of a protection group to which the D member belongs and each P member of that protection group contains parity information respectively being used with remaining data to rebuild a data member of the protection group; and
   the processor, in response to introduction of N new drives, to:
   partition each new drive into (D+P) partitions; and
   calculate that N is less than (D+P) and C is greater than (D+P) and select a donor drive from the existing cluster and form a new cluster using the donor drive and the new drives.

2. The apparatus of claim 1 comprising selection instructions that select a protection group on the existing cluster for migration such that a first member of the selected protection group resides on the donor drive.

3. The apparatus of claim 2 wherein the transfer instructions move members of the selected protection group other than the first member to the new drives.

4. The apparatus of claim 3 wherein the transfer instructions distribute the members of the selected protection group other than the first member to different ones of the new drives such that no more than one member of the selected protection group resides on a single one of the new drives.

5. The apparatus of claim 4 wherein the transfer instructions move members of protection groups other than the selected protection group from the donor drive to other drives of the existing cluster.

6. The apparatus of claim 5 wherein the transfer instructions move the members of protection groups other than the selected protection group from the donor drive to other drives of the existing cluster such that no more than one of the members of any protection group resides on a single one of the other drives of the existing cluster.

7. The apparatus of claim 6 wherein the transfer instructions move the donor drive with the first member to the new cluster.

8. A method implemented in a storage system comprising:
   at least one computing node having a processor and non-transitory memory, and an existing cluster of C drives managed by the at least one computing node, wherein redundant array of independent drives (RAID) protection groups each comprising no more or less than (D+P) members are implemented on the existing cluster, wherein D and P are constants and each D member contains data respectively being used to rebuild at least one parity member of a protection group to which the D member belongs and each P member contains parity information respectively being used with remaining data to rebuild a data member of the protection group, wherein:
   responsive to introduction of N new drives, partitioning each new drive into (D+P) partitions;
   calculating that N is less than (D+P) and C is greater than (D+P);
   selecting a donor drive from the existing cluster; and
   forming a new cluster using the donor drive and the new drives.

9. The method of claim 8 comprising selecting a protection group on the existing cluster for migration such that a first member of the selected protection group resides on the donor drive.

10. The method of claim 9 comprising moving members of the selected protection group other than the first member to the new drives.

11. The method of claim 10 comprising distributing the members of the selected protection group other than the first member to different ones of the new drives such that no more than one member of the selected protection group resides on a single one of the new drives.

12. The method of claim 11 comprising moving members of protection groups other than the selected protection group from the donor drive to other drives of the existing cluster.

13. The method of claim 12 comprising moving the members of protection groups other than the selected protection group from the donor drive to other drives of the existing cluster such that no more than one of the members of any protection group resides on a single one of the other drives of the existing cluster.

14. The apparatus of claim 13 comprising moving the donor drive with the first member to the new cluster.

15. A non-transitory computer-readable storage medium storing instructions that when executed by a computer cause the computer to perform a method for using a computer system to increase storage capacity, the method comprising:
responsive to introduction of N new drives to a system comprising an existing cluster of C drives managed by at least one computing node, wherein redundant array of independent drive (RAID) protection groups each comprising no more or less than (D+P) members that are implemented on the existing cluster, and wherein D and P are constants and each D member contains data respectively being used to rebuild at least one parity member of a protection group to which the D member belongs and each P member contains parity information capable of respectively being used with remaining data to rebuild a data member of the protection group, partitioning each new drive into (D+P) partitions;
responsive to calculating that N is less than (D+P) and C is greater than (D+P), selecting a donor drive from the existing cluster; and
forming a new cluster using the donor drive and the new drives.

16. The non-transitory computer-readable storage medium of claim 8 wherein the method further comprises selecting a protection group on the existing cluster for migration such that a first member of the selected protection group resides on the donor drive.

17. The non-transitory computer-readable storage medium of claim 16 wherein the method further comprises moving members of the selected protection group other than the first member to the new drives.

18. The non-transitory computer-readable storage medium of claim 17 wherein the method further comprises moving members of protection groups other than the selected protection group from the donor drive to other drives of the existing cluster.

19. The non-transitory computer-readable storage medium of claim 18 wherein the method further comprises moving the members of protection groups other than the selected protection group from the donor drive to other drives of the existing cluster such that no more than one of the members of any protection group resides on a single one of the other drives of the existing cluster.

20. The non-transitory computer-readable storage medium of claim 19 wherein the method further comprises moving the donor drive with the first member to the new cluster.

* * * * *